F. BEDFORD & C. E. WILLIAMS.
CATALYTIC SYNTHESIS OF METHANE.
APPLICATION FILED FEB. 25, 1910.
983,199.
Patented Jan. 31, 1911.
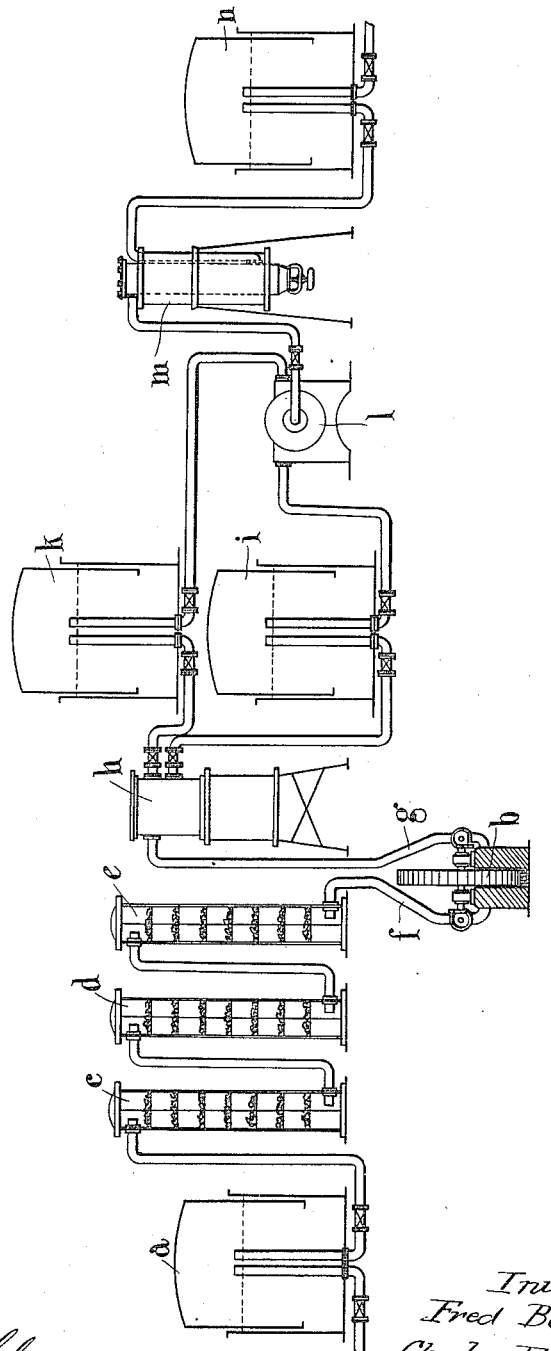

UNITED STATES PATENT OFFICE.

FRED BEDFORD AND CHARLES E. WILLIAMS, OF SLEAFORD, ENGLAND, ASSIGNORS TO CEDFORD GAS PROCESS COMPANY, OF LONDON, ENGLAND.

CATALYTIC SYNTHESIS OF METHANE.

983,199.  Specification of Letters Patent.  Patented Jan. 31, 1911.

Application filed February 25, 1910. Serial No. 546,016.

*To all whom it may concern:*

Be it known that we, FRED BEDFORD, Ph. D., B. Sc. Lond., and CHARLES EDWARD WILLIAMS, subjects of the King of Great Britain and Ireland, and residing at Sleaford, in the county of Lincoln, England, have invented certain new and useful Improvements in and Connected with the Catalytic Synthesis of Methane, of which the following is a specification.

This invention relates to an improved process for the catalytic synthesis of methane or a mixture of methane with other gases.

The value of ordinary coal gas is due to the large percentage of methane contained therein, and attempts have been made to produce methane synthetically from carbon oxids by the action of hydrogen in the presence of finely divided nickel, the function of the latter being simply catalytic. The reactions which take place may be represented by the equations:—

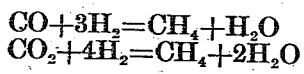

$$CO + 3H_2 = CH_4 + H_2O$$
$$CO_2 + 4H_2 = CH_4 + 2H_2O$$

This catalytic reaction proceeds smoothly provided the reacting gases are pure, and provided also that hydrogen is present in sufficient quantity as demanded by the above equations. If, however, the reacting gases contain certain substances—hereinafter termed impurities—such as sulfureted hydrogen, carbon disulfid, mercaptan and sulfur compounds in general, even if only in very minute quantities, the nickel very soon loses its activity. In order, therefore, to preserve the activity of the nickel, it is essential that the impurities invariably present in commercial gases be carefully removed before the latter are allowed to come in contact with the catalytic nickel. Various processes have been proposed for the removal of the impurities. Again all commercial gases obtained by gasifying coal and containing hydrogen and carbon monoxid are deficient in hydrogen. Various methods have been proposed for the removal of the sulfur impurities, and for obtaining carbon monoxid and hydrogen in the proper relative quantities, either by varying the mode of manufacture of the gases or by adding hydrogen. Some of these methods have depended on the cooling of the gases to a degree sufficient only to liquefy them with a view to the separation of certain of the constituents. But none of these processes have been so far commercially successful.

The object of this invention is to provide a process by which the sulfur impurities may be effectually removed and at the same time the cheapest of the commercial gases of the type of Mond gas and Duff gas and the like may be commercially treated for the production of methane, without there being any need to modify their process of manufacture. In carrying out this process the mixture of gases (which should be first freed from carbon dioxid) is cooled to the degree necessary in order to get the sulfur impurities into a solid form having little or no vapor tension the hydrogen passing off as a gas and being collected while the carbon monoxid, nitrogen, and methane will be liquid or solid. On allowing this latter mixture to evaporate carbon monoxid and nitrogen distil off first and are effectually separated from the sulfur impurities. After this distillation process a certain quantity of the carbon monoxid obtained is mixed with the hydrogen so that the hydrogen and carbon monoxid are in the required proportions. This mixture is passed over nickel in the known manner. There should always be an excess of hydrogen over the theoretical quantity in order to prevent local heating of the metal. The amount of this excess depends on various circumstances, such as the speed at which the gaseous mixture is passed over the metal, and if nitrogen is present this acts as a diluent and assists in preventing local heating, and a smaller excess of hydrogen may be used than would otherwise be necessary.

To illustrate one mode of carrying out the invention, suppose it be required to prepare methane synthetically from a Mond gas of the following approximate composition:—

| | |
|---|---|
| Hydrogen | 28.0% |
| Carbon monoxid | 11.0% |
| Carbon dioxid | 16.0% |
| Methane | 2.0% |
| Nitrogen | 43.0% |

The carbon dioxid is first removed in any known manner, for example, by absorption in a solution of sodium carbonate, such removal being desirable to prevent the clogging of the apparatus by the carbon dioxid. The residual mixture is passed through a cooling apparatus adapted to cool it to about —190° C. A cooling apparatus of the well known type used in the fractional abstraction method of obtaining oxygen from the air may be employed for this purpose. After this cooling process the hydrogen passes off as a gas, carrying with it small quantities only of carbon monoxid and nitrogen, but leaving behind it the bulk of these gases with the methane and all the sulfur impurities in the solid form that were present in the commercial gas. On evaporating the mixture left after the removal of the hydrogen, the carbon monoxid and nitrogen distil off first, and these may be separated by known means, for example, by absorption of the carbon monoxid by means of cuprous chlorid solution, from which the carbon monoxid can be again obtained by evaporation. A certain quantity of the carbon monoxid thus obtained is mixed with the hydrogen so that these two gases are present in the required quantities and the mixture entirely freed from the impurities which were present in the commercial gas, is passed over heated finely divided nickel. By separating out the impurities as above described, the life of the catalytic nickel is considerably prolonged.

The accompanying drawing illustrates one convenient form of apparatus for carrying out the process according to the present invention and in the following description it will be assumed that it is desired to synthesize methane from water gas.

Water gas, produced in any usual manner, is passed into the gas-holder $a$, which may be of any convenient construction. From the gasometer $a$ the crude water gas is drawn by means of a pump $b$, through a pair of towers $c$, $d$, containing slaked lime placed upon baffles or perforated plates and thence through a third tower $e$ containing calcium chlorid, the function of the latter being to remove the carbon dioxid from the gas. A sample of the gas, after passing through the tower $e$ would be found to give no turbidity with baryta water nor would it turn lead acetate paper brown, but a test with heated finely divided nickel would prove that the purification thus far carried out was utterly inadequate, as with even the minutest traces of sulfur impurities in the gas would be sufficient to kill the catalytic activity of the nickel. The partially purified gas is drawn from the tower $e$ through the pipe $f$ by the pump $b$ and forced out through the pipe $g$ into one of the well-known liquefiers $h$ where the separation of the hydrogen from the carbon monoxid takes place, the latter liquefying and carrying down with it in the solid form the minute trace of impurities which would otherwise be detrimental to the nickel. The hydrogen which remains in the gaseous state, is led off into the gas holder $i$. The liquid carbon monoxid in the liquefier $h$ is allowed to boil off into the gas-holder $k$ at such a rate that the temperature of $h$ is never allowed to rise above —180° C. This is accomplished by never allowing all the carbon monoxid to evaporate. By these means all the deleterious impurities are held back in the liquefier $h$. The inlets to the gas mixer $l$ are so adjusted that the hydrogen and carbon monoxid flowing therethrough from the gas holders $i$ and $k$ are adjusted in the correct proportions demanded by theory, that is, in the proportion of not less than three to one. This mixture then leaves the gas mixer $l$ and is made to pass through a tower $m$ containing finely divided nickel and heated by means of an oil bath or other suitable means to a temperature of about 250° C. This last step results in the transformation of the mixture of hydrogen and carbon monoxid into methane, the latter being collected in the gas holder $n$ where it may be stored for further use or whence it may be directly drawn off if required.

The series of operations for the synthesizing of Mond gas is similar to those described for water gas with the exception that it is advisable to substitute iron hydroxid for slaked lime in one of the towers $c$, $d$. On fractionating the Mond gas by means of the liquefier $h$, the hydrogen is again collected in the gas holder $i$ and a mixture of carbon monoxid and nitrogen will be collected in $k$. In this case, as in all cases where the original gas contains nitrogen, the mixer $l$ is so adjusted that the mixture of carbon monoxid and nitrogen contains the requisite quantity of carbon monoxid. The final gas after passing through the tower $m$ is a mixture of methane and nitrogen, which mixture may be separated by means of a liquefier similar to $h$.

Another mode of carrying out the synthesis of methane from Mond gas and the like is to first subject the gas, after freeing it from carbon dioxid, to the temperature of liquid air in such a manner that the impurities separate out in the solid form possessing little or no vapor tension and that the whole of the carbon monoxid does not become liquid, but the hydrogen retains the requisite amount of carbon monoxid for the synthesis of methane. This can be effected by regulating the pressure at which the fractional separation by cooling takes place. The mixture of hydrogen, carbon monoxid and nitrogen, freed from impurities by the cooling, is passed over heated finely divided nickel, a mixture of methane and nitrogen being thus formed. The nitrogen can be separated out by subjecting the mixture to a temperature of about —180° C., the nitrogen remaining as a gas and the methane liquefying. The nitrogen may also be separated by any other known means.

It is to be noted that nitrogen is not an impurity in the sense hereinbefore referred to and it is immaterial, so far as the catalytic activity of the nickel is concerned, whether it is present or not during the catalytic reaction. In some cases as for instance in the case of coal gas it is advantageous before the gases are cooled to partly purify them, e. g., with iron hydroxid.

Having now described our invention what we claim as new and desire to secure by Letters Patent is:—

1. A process for the catalytic synthesis of methane from a commercial gas containing hydrogen and carbon monoxid comprising cooling the commercial gas to such a degree that the impurities separate out in the solid form possessing little or no vapor tension and passing the purified commercial gas into contact with a heated catalytic substance, for the purpose set forth.

2. A process for the catalytic synthesis of methane from a commercial gas containing hydrogen and carbon monoxid comprising subjecting the commercial gas to a cooling process for the purpose of separating out the impurities in the solid form possessing little or no vapor tension, and in such a manner that the hydrogen retains the requisite quantity of carbon monoxid, and passing the mixture into contact with a heated catalytic substance, for the purpose set forth.

3. A process for the catalytic synthesis of methane from a commercial gas containing hydrogen and carbon monoxid comprising subjecting the commercial gas to a cooling process for the purpose of separating out the impurities in the solid form possessing little or no vapor tension, and in such a manner that the hydrogen retains the requisite quantity of carbon monoxid, passing the mixture into contact with a heated catalytic substance, and separating out the methane.

4. A process for the catalytic synthesis of methane from a commercial gas containing hydrogen and carbon monoxid comprising subjecting the commercial gas to a cooling process for the purpose of separating out the impurities in the solid form possessing little or no vapor tension, and in such a manner that the hydrogen retains the requisite quantity of carbon monoxid, passing the mixture into contact with a heated catalytic substance in the presence of an excess of nitrogen, and separating out the methane.

In testimony whereof, we affix our signatures in presence of two witnesses.

FRED BEDFORD.
CHAS. ED. WILLIAMS.

Witnesses:
W. W. TRIGGS,
BERTRAM H. MATTHEWS.